Figure 1:
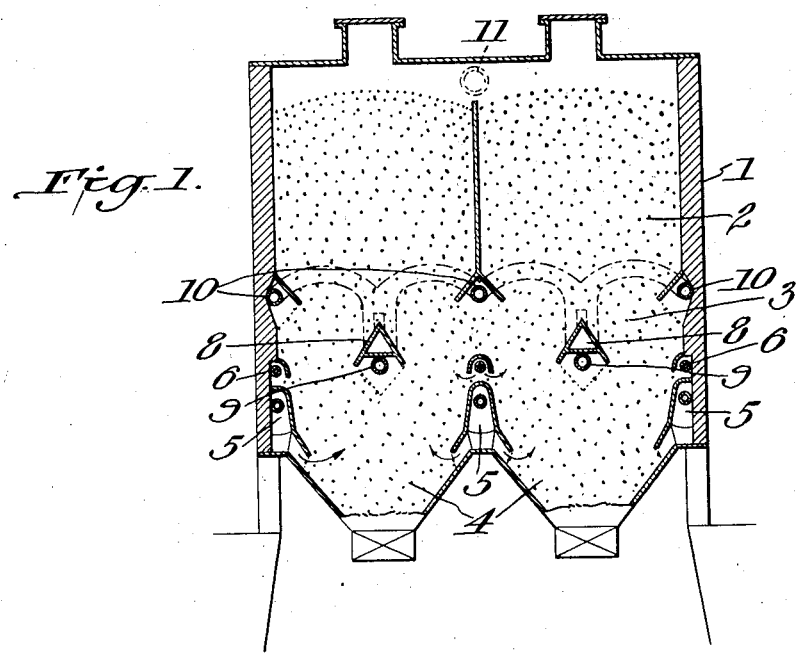

Nov. 6, 1928.

O. HUBMANN 1,690,935

PROCESS AND APPARATUS FOR DISTILLATION OF COMBUSTIBLE MATERIALS

Filed Dec. 7, 1926

Inventor:
Otto Hubmann

By Byrnes, Townsend & Brickenstein
his Attorneys.

UNITED STATES PATENT OFFICE.

OTTO HUBMANN, OF FRANKFORT-ON-THE-MAIN, GERMANY, ASSIGNOR TO METALL-BANK & METALLURGISCHE GESELLSCHAFT, AKTIENGESELLSCHAFT, OF FRANK-FORT-ON-THE-MAIN, GERMANY, A CORPORATION OF GERMANY.

PROCESS AND APPARATUS FOR DISTILLATION OF COMBUSTIBLE MATERIALS.

Application filed December 7, 1926, Serial No. 153,180, and in Germany December 18, 1925

This invention relates to the distillation of carbonaceous materials, containing a volatile portion and a combustible solid portion, especially those which have a high ash content, by passing heated gases through such material. This class of materials such as oil shale or slaty coal has heretofore been treated in gasifying devices with an overlying distillation zone, in such a manner that the bitumen content of the combustible material was driven off in the distillation zone and that thereupon the residue still containing much carbonaceous material was further degasified as much as possible. This further degasification is objectionable as much slagging takes place which necessitates an uneconomically greater addition of steam. Further there is required a long degasifying zone and an accordingly expensive construction, since the high ash content greatly retards the progress of the reaction. It was therefore more economical to entirely omit the degasification of the residue and to heat the distillation apparatus by expensive combustible material from an external source. According to this invention, the carbon content of the distillation residue is only partially degasified or burnt in a reaction zone lying beneath the distillation zone, and this reaction is so conducted that only so much heat is taken away from the residue as is necessary to supply the heat requirement of the whole distillation process.

The distillation process is carried out as follows:

The gaseous distilling medium, either poor in or free from oxygen, is first suitably preheated by heat-exchange with the hot distillation residue. Then before it is admitted to the distillation zone, it is brought to the temperature requisite for distillation by mixture with the hot reaction gases which are produced in the reaction zone by introduction of air, preheated if necessary, into the distillation residue. The thus heated distillation medium passes into the distillation zone and thence into an apparatus for the separation of the valuable distillation products. After the separation, there remains a combustible gas, which can be used in the cycle as a distilling medium, for example by conducting it into the cooling zone for the hot residue. Any surplus gas can, in well known manner, be burnt for preheating the charge to be distilled, whereby evidently an advantageous diminution of the heat requirements for the distillation will be attained.

For better regulation and control of the process a part of the distilling medium instead of being passed directly into the cooling zone beneath the distillation zone can be introduced thereinto in such manner that the residue-cooling gases and the reaction gases can be sucked out of the reaction zone. Thereby there is insured a good mixing and uniform heating up of gas current entering the distillation zone. The arrangement for sucking out the gases from the residue-cooling zone and the reaction zone is suitably cooled by providing it with channels through which flow cool gases. By cool gases is meant gases substantially cooler than the gases from the reaction zone, and in general, in this specification and in the claims "cool gases" denotes gases below 300° C. in temperature.

The cool gases, which are thus preheated can also be mixed with the distilling medium.

In like manner the channels for the introduction of combustion air into the reaction zone can be cooled by gases, whereby the premature destruction of these channels, usually made of iron, is avoided and the baking-on of the residue to the walls is prevented.

By this new process it is possible to carry out the reaction in the reaction zone without the usual mixture of steam, and because of the increased reaction velocity the reaction zone can be kept very short.

Figure 2:
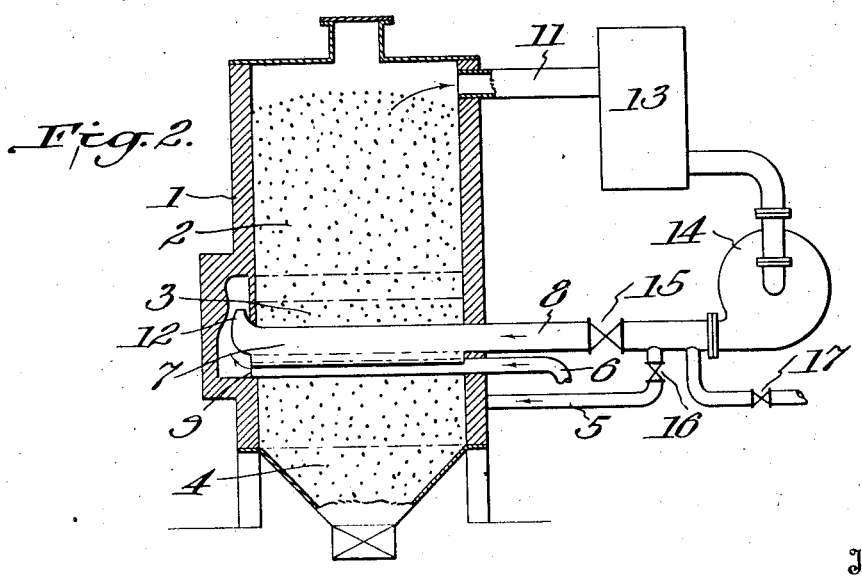

Preferably the gas used for cooling air-channels and thereby preheated, is also mixed with the distilling medium either directly or after passing through the residue-cooling zone. The apparatus used is shown in the accompanying figures in which Fig. 1 is a sectional elevation, and Fig. 2 is a sectional elevation on plane II—II of Fig. 1.

The numeral 1 indicates the distilling shaft or stack with the distillation zone 2, the reaction zone 3 and the residue-cooling zone 4. 5, 5 are the conduits for introducing gases into the residue-cooling zone and 6, 6 the conduits for introducing air. 7 is a device for withdrawing the residue-cooling gas and the gas from the reaction zone, and comprises a gas passage 9 and a cooling conduit 8 through which flow cool gases.

The conduits 10 serve to introduce the distilling medium into the shaft beneath the distilling zone, while the gas resulting from the distillation and carrying the condensible distillation products is drawn off through pipe 11. 12 is an injector-like arrangement for sucking the gases out of the passages 9.

The operation is as follows:—

The preferably previously dried solid combustible material passes down through the distillation zone 2, the reaction zone 3 and the residue-cooling zone 4 at a rate controlled by the rate of withdrawal of the residue from the residue-cooling zone 4.

Through the conduits 5 cool oxygen-free combustible gases are introduced into the residue-cooling zone. Through the conduits 6 air is introduced into the reaction zone 3 where combustion takes place. The preheated gases from the cooling zone 4 and the products of combustion or reaction gases from the zone 3 are sucked out through the passage 9 by the ejector apparatus 7. It is not material whether or not the combustible distilling medium, which has been preheated in the zone 4, is burned to a small extent. From the passage 9 the gases are forced by the injector 12 into the conduits 10, which are connected to the injector chamber by conduits indicated in dotted lines. From the conduits 10, the hot combined gases pass into the distillation zone. The gases flowing out of the distillation zone 2 pass through conduit 11 into a cooler and separator 13 for removal of the condensible constituents. The cooled gases are compressed by fan 14 and, by suitably adjusting valves 15 and 16, returned to the distillation apparatus through conduits 5 and 8; the gases introduced through conduit 8 serve to operate the ejector 7. The excess of gas is removed through valve 17 and can be utilized for other purposes.

The cool gases flowing through the conduits 5 cool in an effective manner the pipes 6 through which combustion air is introduced and prevent the baking on of the heated residue to the shaft walls.

Obviously, several of these distillation shafts can be arranged in series one after the other.

By this process the difficulties of degasifying residues of ash-containing combustible material are obviated without the utilization of heat energy from extraneous sources of heat. There results therefore an essential advance in the distillation of combustible materials of high ash-content.

I claim:

1. Process for the continuous distillation of high-ash solid carbonaceous material containing a volatile portion and a combustible solid portion by contact with hot gases which consists in passing a charge of such material downwardly and in continuous flow successively through a distillation zone, a reaction zone, and a residue-cooling zone, introducing oxygen-free gases into the cooling zone and thereby heating them, introducing oxygen containing gases into the reaction zone whereby combustion or reaction occurs with the distilled material which still contains combustible material, sucking out and mixing the hot gases from both zones, and passing them into the distillation zone, where distillation of the charge is effected.

2. A process as claimed in claim 1 in which the sucking out and mixing of the gases from the residue and the residue-cooling zones is effected by the injector action of a current of cool oxygen-free gases heated by indirect contact with the downwardly moving charge.

3. Apparatus for distillation of carbonaceous materials containing a volatile portion and a combustible solid portion by contact with hot gases comprising a shaft having means for charging and discharging material, means for introducing hot gases into the upper portion of the shaft, thereby forming a distilling zone, means for introducing air into the charge below the distilling zone, thereby forming a reaction zone, means for introducing an oxygen-free gas into the lower portion of the shaft, thereby forming a charge-cooling and gas-preheating zone, aforesaid means for introducing hot gases into the upper portion of the shaft comprising injector means for sucking out the preheated and reaction gases and a conduit for introducing said preheated and reaction gases into the lower portion of the distilling zone.

4. An apparatus as claimed in claim 3 in which the injector means comprises a conduit extending across the shaft between the reaction zone and the distilling zone and adapted to be connected at one end to a source of cool gas and having an injector nozzle at its other end, a gas passage located immediately beneath said conduit, the wall of the shaft having formed thereon a chamber into which open said pipe and said injector nozzle and a conduit connected to the exit end of said chamber and to the interior of the shaft.

5. An apparatus as claimed in claim 3 in which means for introducing cool gas are located on the side walls of the shaft in proximity to the means for introducing air.

In testimony whereof, I affix my signature.

OTTO HUBMANN.

CERTIFICATE OF CORRECTION.

Patent No. 1,690,935. Granted November 6, 1928, to

OTTO HUBMANN.

It is hereby certified that error appears in the printed specification of the above numbered patent requiring correction as follows: Page 2, line 75, claim 2, for the word "clam" read "claim" and line 77, for the word "residue" first occurrence read "reaction"; and that the said Letters Patent should be read with these corrections therein that the same may conform to the record of the case in the Patent Office.

Signed and sealed this 11th day of December, A. D. 1928.

(Seal)

M. J. Moore,
Acting Commissioner of Patents.